(12) United States Patent
Swamy et al.

(10) Patent No.: US 7,450,131 B2
(45) Date of Patent: Nov. 11, 2008

(54) MEMORY LAYOUT FOR RE-ORDERING INSTRUCTIONS USING POINTERS

(75) Inventors: Shankar N. Swamy, Folsom, CA (US); Oliver Heim, Cameron Park, CA (US)

(73) Assignee: Intel Corporation, Santa Clara, CA (US)

( * ) Notice: Subject to any disclaimer, the term of this patent is extended or adjusted under 35 U.S.C. 154(b) by 378 days.

(21) Appl. No.: 11/240,984

(22) Filed: Sep. 30, 2005

(65) Prior Publication Data

US 2007/0076010 A1  Apr. 5, 2007

(51) Int. Cl.
  *G06F 12/02* (2006.01)
  *G06F 9/45* (2006.01)
  *G06F 13/18* (2006.01)
  *G06T 1/20* (2006.01)

(52) U.S. Cl. .............. 345/565; 345/522; 345/566; 712/200; 710/23; 710/26; 710/39; 717/106; 717/136; 717/140; 717/148

(58) Field of Classification Search ......... 345/501–506, 345/522, 530, 533, 541–543, 553, 556, 564–566, 345/426, 582, 418; 712/220, 223, 229, 230, 712/233, 245, 200, 244, 203–205, 214, 215, 712/225–226; 711/1, 100, 125, 133, 134, 711/123; 717/136, 140, 106, 141, 145–151; 710/23, 26, 31, 33, 5, 39
See application file for complete search history.

(56) References Cited

U.S. PATENT DOCUMENTS

| | | | | |
|---|---|---|---|---|
| 5,634,046 A | * | 5/1997 | Chatterjee et al. | 712/227 |
| 5,938,747 A | * | 8/1999 | Young | 710/53 |
| 6,021,275 A | * | 2/2000 | Horwat | 717/159 |
| 6,243,864 B1 | * | 6/2001 | Odani et al. | 717/154 |
| 6,640,297 B1 | * | 10/2003 | Banning et al. | 712/238 |
| 2001/0005882 A1 | * | 6/2001 | Ekner | 712/244 |
| 2002/0013866 A1 | * | 1/2002 | Noeldner et al. | 710/22 |
| 2003/0034544 A1 | * | 2/2003 | May et al. | 257/523 |
| 2003/0154468 A1 | * | 8/2003 | Gordon et al. | 717/143 |
| 2004/0003377 A1 | * | 1/2004 | Di Loreto | 717/136 |
| 2005/0251667 A1 | * | 11/2005 | Iwamoto | 712/233 |

OTHER PUBLICATIONS

Poletto, et al., "Linear Scan Register Allocation," ACM Transactions on Programming Languages and Systems, vol. 21, No. 5, Sep. 1999, pp. 895-913.

* cited by examiner

*Primary Examiner*—Wesner Sajous
(74) *Attorney, Agent, or Firm*—Blakely, Sokoloff, Taylor & Zafman LLP

(57) ABSTRACT

Embodiments include storing graphics instructions at addresses in a memory in an original order, and storing in the memory pointers associated with each instruction pointing to the addresses of the instructions in the original order. A first pointer associated with a first graphics instruction may then be moved from pointing to a first address of the first graphics instruction to point to a second address of a second graphics instruction. Likewise, a second pointer associated with the second graphics instruction may be moved from pointing to the second address to point to the first address by accessing the first pointer before moving the first pointer to determine that the second pointer is to point to the first address (e.g., the address the first instruction points to before being moved). Afterwards, the instructions may be re-ordered into an optimized order for compiling, by switching them to different addresses according to the pointers.

18 Claims, 6 Drawing Sheets

MEMORY LAYOUT FOR RE-ORDERING INSTRUCTIONS USING POINTERS

BACKGROUND

1. Field

The field generally relates to just-in-time compiling graphics shader instructions during execution of an application.

2. Background

One of the crucial tests of computer graphics hardware is programmed execution speed. For example, if graphics hardware is not able to execute portions of an application to display a video or images that update in real time, the display quality might suffer, such as by not appearing smooth and appealing to a viewer. Specifically, a motion of objects which are present in a current frame of image or video data, may have an inappropriate shape, color, or may have a "jerky" transition to a subsequent frame.

Although various factors can affect the execution speed of a program, one of the most important factors is the level of optimization of execution provided by a just-in-time (JIT) compiler of graphics shaders. A graphics "shader" may be described as a sequence, series, order, region, and/or portion of graphics shader code, instructions, programs, and/or software. In many cases, the level of optimization that can be achieved is largely determined by the memory layout of the shader code instructions in physical memory prior to compiling. In many memory layouts, prior to compiling, the original order of the instructions are laid out sequentially, in a single tree structure, and/or in an "n-ary tree data structure." However, these layouts may not necessarily provide the most efficient order for a JIT compiler to compile the shader code into machine executable code. Thus, it may be desired to re-order shader code instructions from an original order (e.g., the order or sequence of the instructions in the program or application) into a re-ordered order that may be compiled more efficiently, while minimizing the amount of memory required to perform such re-ordering.

BRIEF DESCRIPTION OF THE DRAWINGS

Various features, aspects and advantages will become more thoroughly apparent from the following detailed description, the set of claims, and accompanying drawings in which:

DETAILED DESCRIPTION

Figure 1:
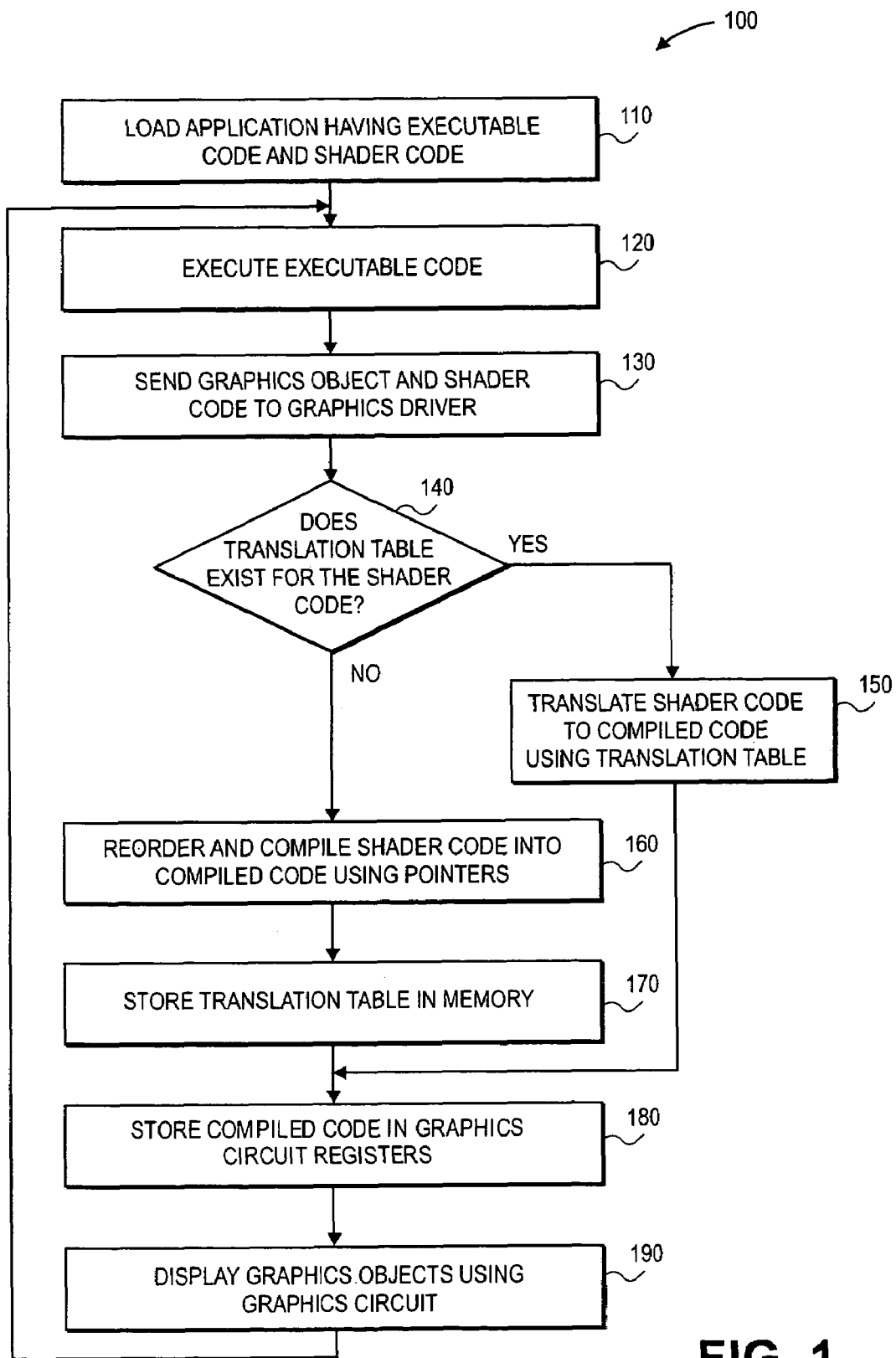
FIG. 1 is a flow diagram of a process for displaying graphical objects using a shader.

Descriptions herein include a method and a memory layout for re-ordering graphics shader code instructions from an original order to a re-ordered order, using pointers, so that a compiler may quickly and efficiently compile the re-ordered instructions into an intermediate language or machine language code. For example, FIG. 1 is a flow diagram of a process for displaying graphical objects using a shader. FIG. 1 shows process 100 for displaying graphical objects of an application using shader code. At block 110, an application having executable code and shader code is loaded, such as by an operating system storing the application in the memory of a computing device. Computing devices contemplated include personal computers (PC), desktop computers, computing systems, portable computing devices, handheld computing devices, telephones, cellular phones, game devices, Internet related computing devices, servers, digital video disk (DVD) players, set top boxes, as well as video storage and editing devices. In some cases, the computing device will have a main memory coupled to a processor, an operating system to be executed by the processor, and a graphics circuit to store instructions of compiled shader code in registers to display objects of an application on a monitor or screen.

Applications having shader code contemplated include those having one or more graphics shaders; or portions, or regions of shader code. Each shader may include shader code, shader code instructions, and/or shader instructions, such as in a high level language, text, or other shader languages or protocol as known in the industry. The shader code provides "rules" or information of how to display shapes, color, shading, etc. of the graphics object, shapes, primitives on the monitor or screen. For example, an application may be a game or other software program or application having graphics objects to be displayed on a computer screen or monitor over time to appear smooth and appealing to a person viewing those graphics. A graphics "object" may be part of, all of, or include graphics, shapes, color, shading, frames, shadows, primitives, etc. The application may have executable code (e.g., in machine language) capable of being executed on run on many operating systems, such as to send objects, shapes, coloring, etc. to a graphics driver, operating system, and/or graphics circuitry to be displayed on a monitor. The application may also include shader code, such as high level language that is specific to a graphics circuit other than the graphics circuit of the computing device the application is being executed or run on. Such shader code, or such an application including such shader code, may be described as a third party code or application.

At block 120, the executable code of the application is executed. For example, a processor of the computing device into which the application is loaded may execute an executable code portion of that application. The executable code portion may include information for displaying an object, shape, or primitive.

At block 130, a graphics object and shader code to display the graphics object is sent to a graphics driver, such as a driver that is part of the operating system of the computing device. Block 130 may include the processor or operating system (e.g., in according with the executable code of Block 120) sending a graphics object and a graphics shader (or graphics shader code) for displaying the object. The graphics object and shader code may be sent with a message or information identifying that the shader code is for drawing the object. One example of such a graphic driver is the Extreme Graphics Driver®, by Intel Corporation of Cupertino, Calif.

At decision block 140, it is determined whether a translation table exists for the shader in code. For example, block 140 may include the graphics driver or operating system determining whether a translation table has previously been stored in main memory for translating the shader code into compiled code. Also, block 140 may include storing a table resulting from the process described below with respect to blocks 160 and 170.

If that block 140 translation table does not exist, process continues to block 160. At block 160, the shader code is re-ordered and compiled into compiled code using pointers. The pointers may be location pointers, such as pointers to addresses in memory and/or locations in a sequence, series, order, region, and/or portion of a shader or of shader instructions. Also, pointers may be variables identifying or containing an address of a location in memory, such as where the location is the starting point of an allocated object or allocated data, such as an object, a value type, a length of bits or bytes, or the element of an array. The variable may be a symbol, or a name that stands for a value, such as a numeric value, a character, a character string, a virtual memory address, or a physical hardware memory address. In some cases, a pointer may point to a data structure, such as a data structure that can be stored in a simple array or sequential order, such as in memory, and that can be incremented, updated, or changed without changing the pointer's position in its array or sequence. Updating a pointer may include performing a mathematical operation on an existing value, creating a new value, or otherwise replacing a current or old value with a new value.

Block 160 may include using software, operating system code, data structures, translation code, memory, pointers, re-ordering algorithms, graphics drivers, compilers, and just in time compilers as described herein, such as described for FIGS. 2-6 below For example, a shader is a sequence of shader instructions in a specific order. The original sequential order of the instructions may be re-ordered according to an algorithm, such as according to "Linear Scan Registration Allocation," Massimiliano Poletto at Laboratory for Computer Science, Michigan Institute of Technology (MIT) Vivek Sakar at International Business Machines (IBM) Thomas J. Watson Research Center, ACM Transactions on Programming Languages and Systems (TOPLAS), Vol. 21, issued by (September 1999), pages 895 through 913, ISSN: 0164-0925 (herein "The MIT algorithm").

After re-ordering of the instructions, the re-ordered order or sequence of shader code instructions may be compiled, such as by being just-in-time (JIT) compiled into compiled code to be executed by a graphics circuit of the computing device, prior to displaying the object. For instance, the shader code may be shader instructions that are re-ordered into an optimized or more efficient order prior to being compiled by a just-in-time (JIT) compiler into graphics hardware machine language to be executed by a graphics circuit such as a graphics chip, graphics card, graphics processing unit (GPU), etc. The compiled code may be in a language that is specific to the graphics circuit (e.g., is in a machine language, the graphics circuit is capable of executing) while the uncompiled shader code is not specific or native to the graphics circuit (e.g., is in a language of a different graphics circuit or that the current graphics circuit is unable to execute, such as without compiling). It is also considered that the instructions may be shader instructions and/or other instructions of a graphics program. A graphics program may be described as a program having instructions, the majority of which are destined for a graphics circuit. Block 160 may include storing the translation tables in a memory such as main memory, random access (RAM) memory and/or cache memory.

At block 170, a translation table including information for translating the shader code into compiled code is stored, such as in main memory. Block 170 may include storing the translation tables in a memory such as main memory, random access (RAM) memory and/or cache memory. After block 170, processing continues to block 180.

Alternatively, if at decision block 140 a translation table does exist, processing can proceed to block 150. At block 150, the shader code is translated to compiled code using the translation table. Block 150 may include using a translation table generated as described above with respect to blocks 160 and 170 or translating a shader, shader code, shader instructions, shader code instructions, or a portion of a shader application to compile code for a graphics circuit. After block 150, a processing continues to block 180.

At block 180, the compiled code is stored in registers of the graphics circuit. For example, block 180 may include a graphics driver or operating system causing the compiled re-ordered shader instructions to be stored in registers of a graphics circuit, so that the circuit may display an object in accordance with the shader "rules." The graphics circuit may be a graphics processing unit (GPU), graphics card, graphics chip, graphics hardware, such as described below with respect to graphics circuit 532 of FIG. 5. The graphics circuit may be part of the computing device.

At block 190, the graphics object is display using the graphics circuit. For example, the graphics circuit may display the graphics object on a monitor according to the re-ordered compiled graphics instructions stored in the registers of the graphics circuit. After block 190 processing of process 100 may return to block 120. For example, after block 190, additional executable code of the application may be executed. Subsequently the additional executable code may require a display of additional graphics objects using the same, or a different shader, or shader code. Thus, to display the additional graphics objects, at block 140, if the shader code is code previously experienced during execution of the application, a translation table may exist in main memory (e.g., as described at block 170) and the processing may continue to block 150. Alternatively, for additional graphics objects displayed, if the shader has not been previously compiled, processing may continue to block 160 where instructions of the shader code will be re-ordered and compiled as appropriate.

According to some embodiments, block 170 and block 150 are optional, such as where the graphics code instructions are re-ordered and compiled in every case to display a graphics object.

In some cases, graphics instructions may be re-ordered by storing two sets of the instructions in memory and re-arranging the order of the second set of instructions while maintaining the original order in the first set of instructions as a reference, such as in order to perform the re-ordering using an algorithm (e.g., the MIT algorithm cited above). However, a more memory efficient embodiment may be achieved by using pointers to track the re-ordering or moving of each instructions (e.g., as described below for block 225 of FIG. 2.) Then, when moving or re-ordering is complete, the instructions may be moved into a re-ordered order according to the pointers. The re-ordered order may then be compiled, such as by a JIT compiler (e.g., as described above with respect to block 160 of FIG. 1).

Figure 2:
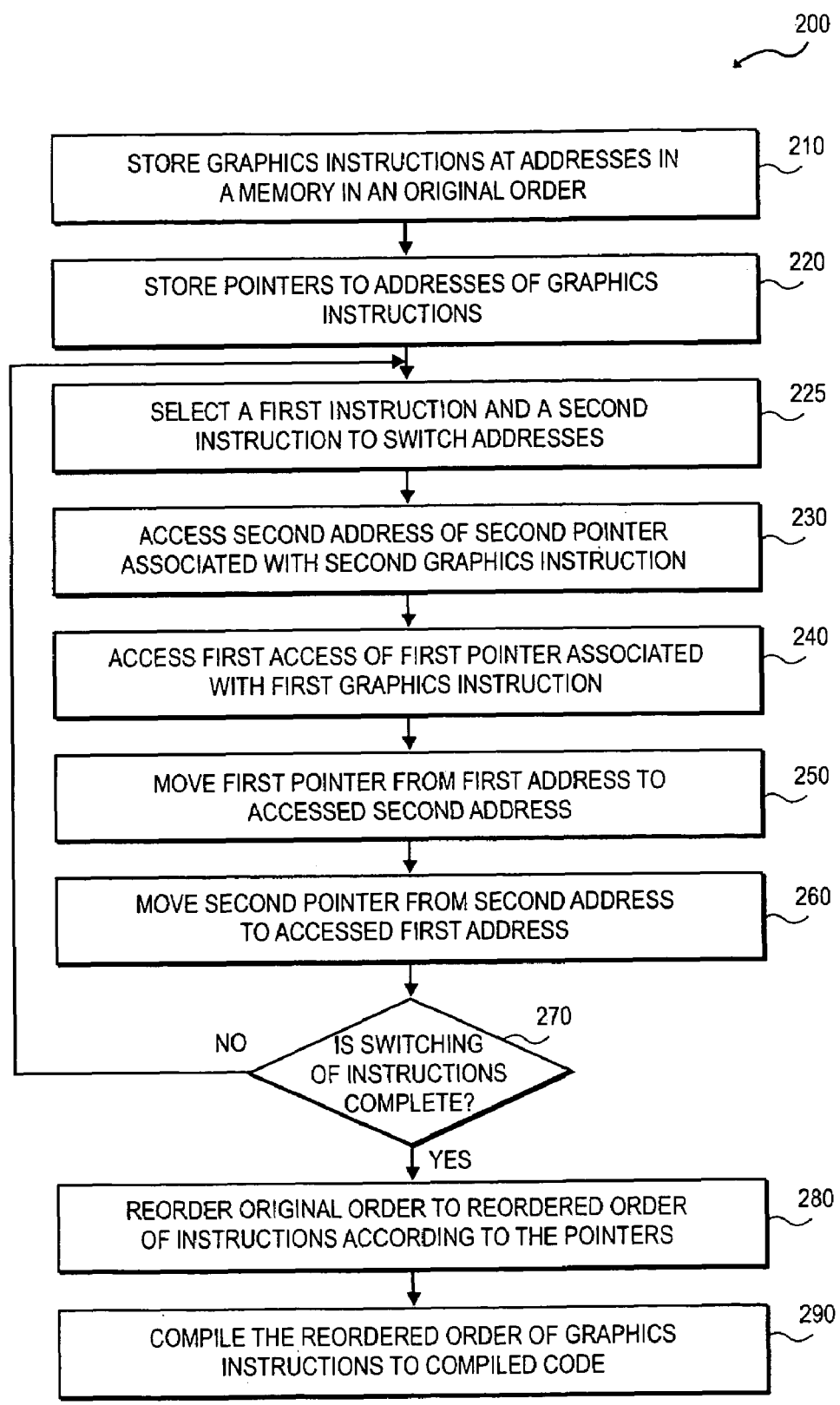
FIG. 2 is a flow diagram of a process for re-ordering and compiling graphics shader code instruction using pointers.

For instance, FIG. 2 is a flow diagram of a process for re-ordering and compiling graphics shader code instruction using pointers. FIG. 2 is a flow diagram of process 200, which may or may not be a process as described above for block 160 of FIG. 1, such as a process for re-ordering and compiling a graphic shader code instructions. At block 210, graphics instructions are stored at addresses in a memory in an original order. For instance, block 210 may include storing graphics instructions of shader code, as described above with respect to block 110 and 130 of FIG. 1. The graphics instructions may be vector instructions, shader code instructions, or other instructions or information that are part of a shader used by a computing device to draw graphics, as described above with respect to blocks 110 through 190 of FIG. 1.

Also, the addresses in memory may be physical addresses, virtual addresses, locations in the memory, or locations in an order, such as an original order of a sequence of the instructions in the application or the portion of the application including the shader or shader code to the graphics driver with an object as described with respect to block 130 of FIG. 1. It is also considered that block 210 may include reading the graphics instruction in the original order from the application (e.g., as described with respect to block 110-130 of FIG. 1).

In some cases, the addresses of the memory may be filled up by reading lines of the shader program line by line, and for each line in the program, checking the register used in the instructions and filling in an interval table as follows. If the register is a destination register, add a new register element with the current line number as beginning line. If the register is a source register, search for the instance of that register in the interval table object and update its end line entry with the current line number. When all the lines of the program have been processed, the life times of all the registers is available from the intervals table, and hardware registers can be assigned in a linear fashion.

For example, each line of the shader or shader code portion of the application may include an instruction opcode, destination registers, and source registers stored in separate instruction structures. Specifically, each shader instruction may include an opcode ("OPCODE"), a destination register ("DST"), a first source register ("SRC0"), a second source register ("SRC 1"), and a third source register ("SRC2"). Also, each instruction may be contained in an instruction structure, such as a structure including the graphics instruction stored at the addresses in the memory in the original order, and pointers to the addresses for the instructions in memory or locations of the instructions in a sequence, where each pointer is associated with one of the instructions. The pointers may include an original location pointer to the address of the instruction in the original order, as well as a re-ordered location pointer to an address or location of the instruction after being moved, such as according to an algorithm which switches addresses of two instructions according to instruction information (e.g., opcode, destination register, and source register information) according to criteria of the algorithm. The re-ordered location pointers may be initialized to "NULL", inactive, or logical low (e.g., a logical "0") before the instructions are stored, moved, or re-ordered in the memory. Alternatively, the re-ordered location pointer may be set to the original location pointer address during or after storing of the instructions. It is also contemplated that the original location pointer, or an additional or third pointer of the pointers may include a pointer to the instruction itself At block 220, pointers to addresses of the graphics instruction stored in the memory are also stored in the memory. For example, block 228 may include storing pointers as described above with respect to block 210 in the same memory that the graphics instructions are stored in, where each pointer is associated with one of the instructions. Thus, each pointer may include one or more pointers that correspond to, or are associated with, or paired with, or are for a single graphics instruction. Each pointer associated with an instruction may be described as including one or more of: a pointer to the instruction; an original location pointer to an address or location of the pointer in memory in the original order; and a re-ordered location pointer to an address or location that the instruction is to be moved to in a re-ordered order to be compiled into compiled code, such as described above with respect to block 160 of FIG. 1. The re-ordered location pointer may point to addresses or locations that are updated during a process of moving the re-ordered location pointers from an initialized value (e.g., NULL, logical "0," or the same address as the location in the original order) to the final address in the re-order order, such as during moving, updating, or re-ordering of pointer locations according to an algorithm (such as according to the MIT algorithm cited above) or other selection criteria (e.g., of selecting various addresses to be switched in the original order sequence until a desired re-ordered sequence is obtained).

Next, at block 225, a first instruction and a second instruction to switch addresses are selected (e.g., such as according to the MIT algorithm as described about). For example, block 225 may include selecting instructions to have their addresses in memory switched or to have their locations in a sequence or order of instructions switched, such as during re-ordering or moving of instructions or of pointers to the instructions during a process to move the instructions from an original order to a re-order order, prior to compiling the instructions and to compile code or use to display graphic (e.g., See FIG. 1).

At block 230, a second address of a second pointer associated with the second graphic instruction is accessed, such as to be stored in memory or otherwise retained for later use in process 200. Block 230 may include accessing the second address to determine or identify that a first pointer to the first instruction is to be moved to the second address in order to affect the switch. It can be appreciated, that the second address should be accessed prior to moving the second pointer to a different address, such as a move that causes an update of the second pointer to the first address (e.g., See lines 322 of FIG. 3 below).

At block 240, a first address of a first pointer associated with the first graphic instruction is accessed, such as to be stored in memory or otherwise retained for later use in process 200. Block 240 may include accessing the first address to determine or identify that a second pointer to the second instruction is to be moved to the first address in order to affect the switch. It can be appreciated, that the first address should be accessed prior to moving the first pointer to a different address, such as a move that causes an update of the first pointer to the second address (e.g., See lines 320 of FIG. 3 below). Thus, a subsequent move of the first and second pointer to switch the re-ordered order addresses or locations of the pointers or instructions to affect the switch of block 225 may be described as according to (or including accessing) the first and second pointers prior to moving the pointers.

At block 250, the first pointer is moved from the first address to the access second address. Block 250 may include moving or updating an address for a location pointed to by a pointer (e.g., a re-ordered order pointer) associated with the first graphics instruction from pointing to a first address such as a NULL, logical "0", or address of the first instruction in the original order to point to an address or location of a second graphics instruction to switch a location or address of the first and second graphics instructions in a sequence, or order, such as an order stored in a memory.

At block 260, the second pointer is moved from the second address to the accessed first address. Block 250 may include moving or updating an address for the location pointed to by a pointer (e.g., a re-ordered order pointer) associated with the second graphics instruction from pointing to a second address such as a NULL, logical "0", or address of the second instruction in the original order to point to an address or location of a first graphics instruction to switch a location or address of the second and first graphics instructions in a sequence, or order, such as an order stored in a memory.

At block 270, it is determined whether the switching of instructions is complete. Block 270 may include determining whether switching of locations of instructions of a shader, or a portion of an application including shader code (e.g., as described for blocks 110 through 130 of FIG. 1, and blocks 210 through 220 above) or pointers associated therewith are moved, updated, or re-ordered in through a re-order ordered as desired, such as according to an algorithm (e.g., the MIT algorithm cited above, block 160 of FIG. 1 and block 225 above).

If at block 270 the switching of instructions is not completed, process 200 may return to block 225 so that two more instructions (which may or may not include the first and/or second instruction most recently switched) can be switched, as described above with respect to blocks 225 through 260. For instance, after block 270, when returning to block 225, a third pointer associated with a third graphics instruction may be moved from pointing to a third address to point to the second address of the first graphics instruction (e.g., such as where during the second selection at block 225 includes selecting the third instruction and the first instruction to switch addresses). Moving the third pointer may include accessing the first pointer to determine that the third pointer is to point to the second address, (e.g., the first and second pointers have been switched and now pointer to these other addresses). Likewise, moving the first pointer from pointing the second address to point to the third address may include accessing the third pointer to determine that the first pointer is point to the third address.

Alternatively, if at block 270 the switching of instructions is completed, processing continues to block 280. At block 280, the original of the instructions may be re-ordered to a read order of instructions according to the pointers. Block 280 may include re-ordering the original order of instructions to a re-ordered order of instructions or a re-ordered sequence of instructions in the memory by moving each instruction having a pointer from an address or location pointed to by the original location pointer to an address or location pointed to by the re-ordered location pointer. It can be appreciated that some instructions move in the order or sequence, while other instructions may move 1, 2, or any number of addresses or locations away from their location in the original order. Moreover, in some cases, although a pointer associated with an instruction (e.g., a re-ordered location pointer) may be moved or updated multiple times, it is only necessary that the instruction be re-ordered or moved once, such as to the final address or location identified by the re-ordered order pointer. It can be appreciated that this may provide more efficient re-ordering with respect to processing resources and time.

At block 290, the re-ordered order of graphics instructions may be compiled to compile the code, such as by a JIT compiler. The compiled code may be code in machine language, such as graphics hardware machine language, to be executed by a graphics circuit, graphics processing unit (GPU), graphics card, graphics chips, graphics hardware (e.g., as described below with respect to graphics circuit 532 of FIG. 5) of a computing device.

As noted above for FIG. 1, in some embodiments, instead of using pointers, it is contemplated that two sets of the graphic instructions may be stored at addresses in memory in an original order. In those cases, after selection at block 225, the second set of instructions in memory may be moved, as selected, without using pointers. However, depending on the size of the instructions, it can be appreciated that the use of pointers may save memory storage space. For example, in the case where each instruction includes four four byte sections (e.g., opcode, DST, SRC1, and SRC0) each instruction may require 16 bytes in memory. For the situation where two sets of graphics instructions are stored at addresses in memory (e.g., "static compilation process") to re-order the instructions, the memory space necessary to move the instructions from an original to a re-ordered order may be 16 bytes for instruction plus one byte to identify the instruction for each set of instructions memory, multiplied by two for the two sets of instructions in memory. Thus, in the static compilation process for each instruction, 34 bytes are necessary for each instruction, in order to use the n-ary tree data structure of the static compilation process.

Alternatively, in an embodiment, using pointers on the same 16 byte instructions, where an original location pointer uses 4 bytes, and a re-ordered location pointer also uses 4 bytes, only 24 bytes are necessary per instruction to store the instruction and pointers (e.g., 16 bytes for the instruction, plus 8 bytes for the pointers). Thus, the process described with respect to FIGS. 1 and 2 may save 10 bytes of memory storage space per instruction, while re-ordering the instructions into an optimized (e.g., into an optimal order according to an algorithm or process such as the MIT linear scan algorithm as cited above) or for compiling and during JIT compilation prior to displaying graphics objects (e.g., as described with respect to block 190 of FIG. 1). It can be appreciated that this saving of memory storage space will be multiplied by the number of shader instructions in a shader, and can become significant with respect to saving memory storage space, increasing performance, and have efficient use of processors, power, and time during re-ordering prior and/or compiling of shader code.

Another efficiency of using pointers to re-order shader instructions, is for a JIT compiler to be able to determine, before compilation, the minimum number of registers that need to be allocated for a particular shader, shader code, or portion of shader code in an application. This is important, because reducing the number of registers used, typically yields an increase in performance, speed, and reduces required processing resources. Specifically, the compiled code may be stored in registers of a graphics circuit. Thus, in addition to providing more memory efficient embodiment, embodiments using the pointers also provide more efficiency with respect to designing and predicting the number of registers of the graphics circuit necessary to store the compiled code. For instance, it may be desirable to minimize or know beforehand the number of registers that will be necessary to store the compiled code in the graphics circuit, such as to reduce hardware requirements of the graphics circuit or to allow a graphics circuit to be designed with a more predictable number of registers. Moreover, in some cases, the number of registers existing or available in a graphics circuit may be limited. In these cases, knowing the number of registers to be used by a compile code of a shader prior to, during, or after compiling may allow the operating system, graphics driver or graphics circuit to reserve fewer of the registers of the graphics circuit, thus providing a more efficient and optimal use of the total limited number of registers of the circuit available. It can be appreciated that the registers of the graphics circuits may be registered that do not exist or use memory, main memory, or cache memory of the computing system. Specifically, the registers may exist only as part of the graphics circuit (e.g., see the description of a graphics circuit as described below with respect to graphics circuit 532 of FIG. 5).

Figure 3:
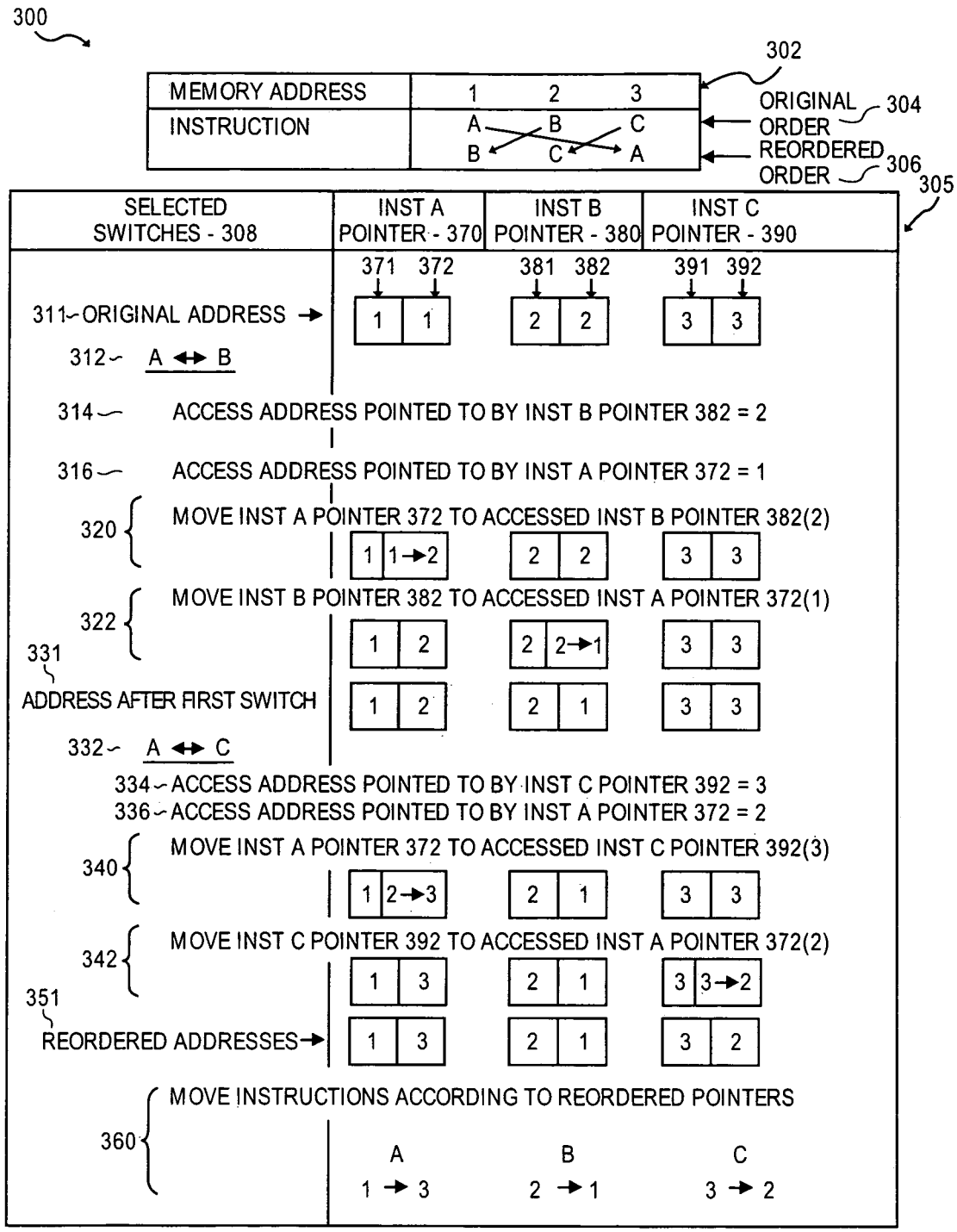
FIG. 3 is a first example of re-ordering graphics shader code instructions using pointers.

FIG. 3 is a first example of re-ordering graphics shader code instructions using pointers. FIG. 3 shows example 300 including table 302 and switches 305. Table 302 serves and example of memory addresses address 1, address 2, and address 3. Instructions A, B, and C are shown in original order 304, where instruction A is in or at address 1, instruction B is in or at address 2, and instruction C is in or at address 3. Table 302 also shows re-ordered order 306, such as an order achieved after switching the address, location, or order of the instructions in or at the memory addresses. 5I-5J Specifically, re-ordered order 306 has instruction B at address 1, instruction C at address 2, and instruction A at address 3.

Switches 305 shows a column for selected switches 308, instruction A pointer 370, instruction B pointer 380, and instruction C pointer 390. For example, at line 311 of switches 305, pointers 370, 380, and 390 point to the original addresses that instructions A, B and C are at original order 304. Specifically, pointer 370 includes original location pointer 371 pointing to address 1, and re-ordered location pointer 372 also pointing to address 1. Alternatively, as noted above with respect to FIG. 2, pointer 372 may initially be NULL, inactive, "0", or another value. Likewise, pointer 380 includes original location pointer 381 and re-ordered location pointer 382, both pointing to address 2. Next, pointer 390 includes original location pointer 391 and re-ordered location pointer 392, both pointing to address 3. Pointer 382 and 392 may alternatively be set to NULL, inactive, "0", or another value, as described with respect to pointer 372.

It can be appreciated that example 300 may correspond to the description above with respect to FIGS. 1 and 2. For instance, pointer 370 may be a first pointer, pointer 380 may be a second pointer and pointer 390 may be a third pointer, as described above with respect to block 220 through 270 of FIG. 2. Similarly, pointers 371, 381, and 391 may be original location pointers, and pointers 372, 382, and 392 may be re-ordered location pointers, as described with respect to blocks 210 through 280 of FIG. 2. Moreover, re-ordered order 306 may be a re-ordered order of instructions to be compiled as described above with respect to block 160 in FIG. 1 and block 290 of FIG. 2.

At line 312, switching instruction A with instruction B in the order or sequence of instruction is selected (e.g., at this point, it is the initial or first switch from original order 304 to the next order, which may or may not include switching, such as where the next order is, a re-ordered order to be compiled). To switch the instructions, at line 314, the address pointed to by instruction B pointer 382 is accessed. At line 314, this address is 2.

At line 316, the address pointed to by instruction A pointer 372 is accessed. At this point, this address is 1. At lines 320, the instruction A pointer 372 is moved to the accessed instruction B pointer 382 (which is 2). Thus, at lines 320, pointer 372 is shown to changing from 1 to 2.

Next, at lines 322, instruction B pointer 382 is moved to the accessed instruction A pointer 372, which is 1. This move is shown at lines 322 by the change of pointer 382 from 2 to 1. Line 331 shows the addresses pointed to after the first switch (the switch between instruction A and B).

At line 332, a switch between instruction A and instruction C is selected. At line 334, the address pointed to by instruction C pointer 392 is accessed (having the current value 3). At line 336, the address pointed to by instruction A pointer 372 is accessed (having current value 2). At lines 340, instruction A pointer 372 is moved to the accessed instruction C pointer 392 (which is 3). This move is shown in lines 340 by the move of pointer 372 from 2 to 3.

At line 342, instructions C pointer 392 is moved to the accessed instruction A pointer 372 (having value 2). This move is shown at line 342 by the move of pointer 392 from 3 to 2. At line 351, the re-order addresses of the pointers are shown.

Line 360 includes moving the instructions according to the re-ordered pointers (e.g., the re-ordered addresses at line 351). For instruction A, the move is shown from address 1 to address 3. For instruction B, the move is from address 2 to address 1. For instruction C, the move is from address 3 to address 2. Thus, instruction A is moved or re-ordered to address 3, B to address 1, and C to address 2 as shown at re-ordered order 306.

It is worth pointing out that at lines 342, the move of the instruction C pointer 392 to address 2 of instruction A occurs correctly because at line 336, the address pointed to by instruction A pointer 372 was accessed after moving instruction A pointer 372 at lines 320 and prior to moving instruction A pointer 372 at lines 340. Without accessing this pointer at this time, intuitively, instruction C may have been moved to address 1, the address of pointer 372 to instruction A in the original order; or address 3, the address of pointer 372 to address A after lines 340.

In some embodiments, it may only be necessary to use one pointer for each instruction. In such cases, a pointer for an instruction or associated with an instruction may be described or defined as the re-ordered location pointer. Thus, in a single pointer embodiment, for instruction A, the pointer would be pointer 372, for instruction B the pointer 382, and for instruction C, the pointer would be pointer 392. Alternatively, an embodiment may be described where pointer 370 includes pointer 372 and at least one other pointer; pointer 380 includes pointer 382 and at least one other pointer; and pointer 390 includes pointer 392 and at least one other pointer. In this alternative embodiment, the other pointer may be an original location pointer (e.g., pointer 371, 381, and 391) a pointer to the instruction (e.g., the actual 16 bytes as described above for FIG. 2), and/or another pointer as desired.

Similar to the description with respect to block 280 of FIG. 2, movement of the instructions at lines 360 may be described as according to pointers 370, 380, and 390; or according to pointers 372, 382, and 392.

Figure 4:
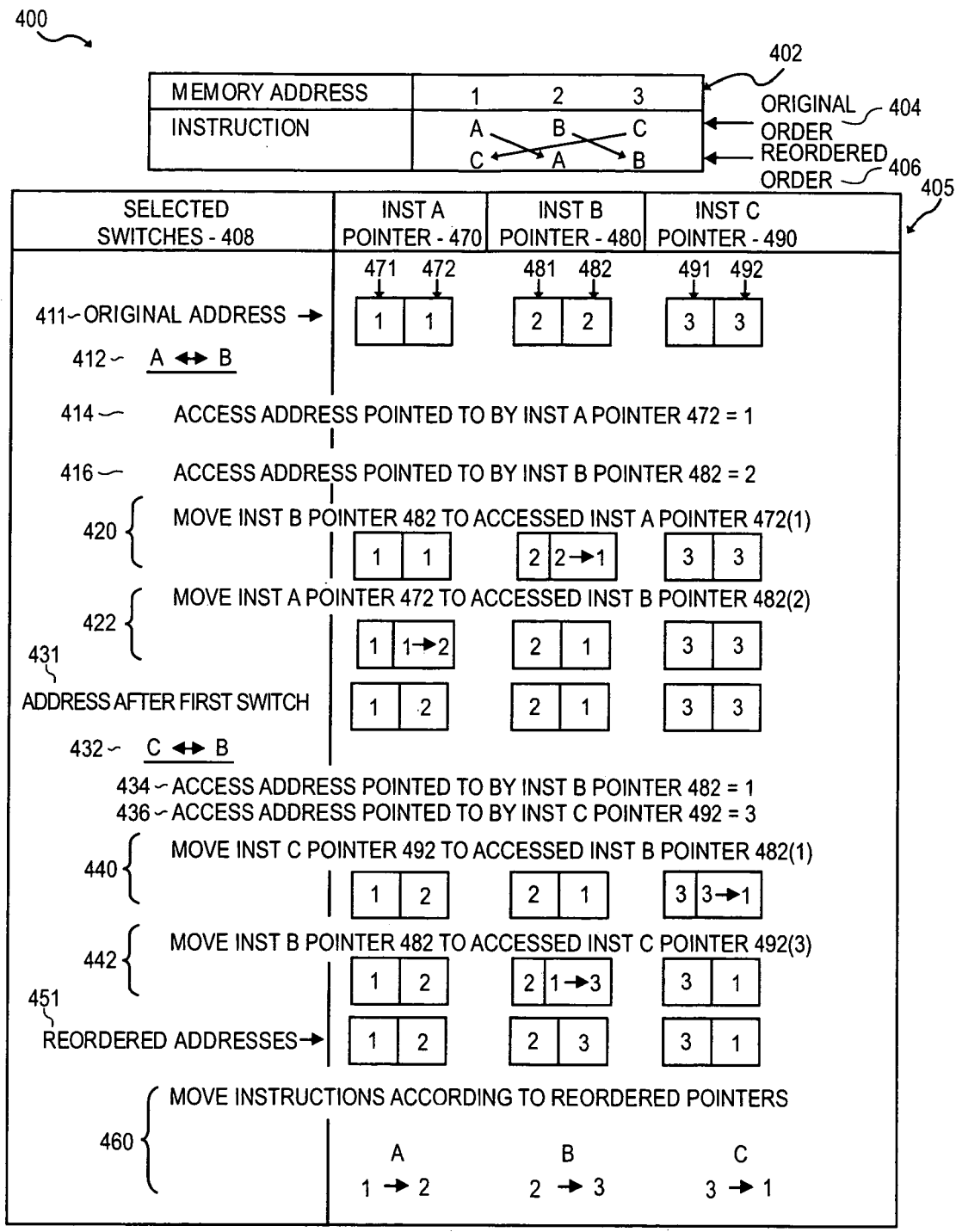
FIG. 4 illustrates a second example of re-ordering graphics shader code instruction using pointers.

FIG. 4 illustrates a second example of re-ordering graphics shader code instruction using pointers. FIG. 4 shows example 400 including table 402 and switches 405. It can be appreciated that at line 440, pointer 492 of instruction C correctly moves to address 1 when switching with instruction B, pointer 482, by access to the address pointed to by instruction B pointer 482 at line 434. Otherwise, intuitively, an error may be made by switching the instructions at addresses 2 and 3 may be erroneously switched (e.g., the location of instruction C with that of instruction A) because instruction B is at address 2 in the original order.

Figure 5:
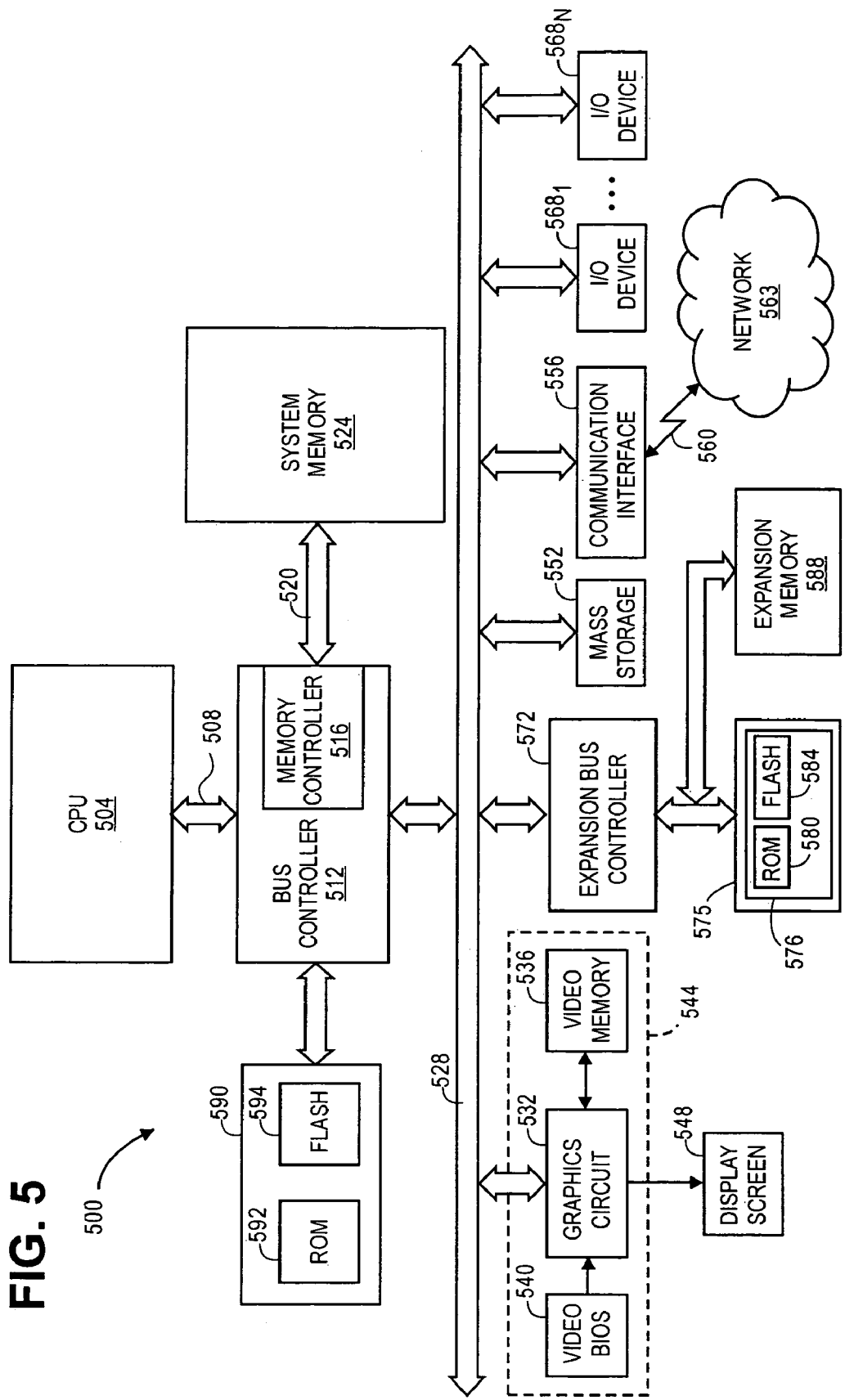
FIG. 5 is a system for re-ordering and compiling shader code instructions using pointers.

FIG. 5 is a system for re-ordering and compiling shader code instructions using pointers. FIG. 5 shows system 500, such as a computer system, a computing device, a computer unit, a machine or system having a processor and memory, or other computing device as described above for blocks 110-130 of FIG. 1. Referring to FIG. 5, system 500 includes a processor or a central processing unit (CPU) 504. CPU 504 may include an Arithmetic Logic Unit (ALU) for performing computations, a collection of registers for temporary storage of data and instructions, and a control unit for controlling operation for system 500. In one embodiment, the CPU 504 includes any one of the x86, Pentium or other processor (e.g., for a PC as known in the art). The CPU 504 is not limited to microprocessor but may take on other forms such as micro controllers, digital signal processors, reduced instruction set computers (RISC), application specific integrated circuits, and the like. Although shown with one CPU 504, system 500 may alternatively include multiple processing units, such as by including a co-processor.

The CPU 504 is coupled to a bus controller 512 by way of a CPU bus 508. Bus controller 512 includes a memory controller 516 integrated therein, through memory controller 516 may be external to bus controller 512. Memory controller 516 provides an interface for access by the CPU 504 or other devices to system memory 524 via memory bus 520. In one embodiment, system memory 524 includes random access memory (RAM), such as synchronous dynamic random access memory (SDRAM), and may include cache memory. System memory 524 may optionally include any additional or alternative high speed memory device or memory circuitry. System memory 524 may be described as "main memory" of system 500, such as a memory to store an application program to be executed by a processor (e.g., CPU 504), or to execute an operating system (e.g., installed in and loaded from mass storage device 552).

Bus controller 512 is coupled to system bus 528 that may be a peripheral component interconnect (PCI) bus, Industry Standard Architecture (ISA) bus, etc. Coupled to system bus 528 are graphics circuit 532, mass storage device 552, communication interface device 556, one or more input/output (I/O) devices $568_1$-$568_N$, and expansion bus controller 572. Graphics circuit 532 is shown coupled to screen 548, such as a computer screen or monitor for displaying graphics, graphics objects, images, frames, video, etc.

According to some embodiments, graphics circuit 532 may be a graphics processing unit (GPU), graphics processor, graphics card, graphics chips, graphics circuit, graphics hardware, graphics controller, or a graphics engine. Graphics circuit 532 may include one or more hardware chips on one or more carrier substrates, printed circuit boards (PCBs), motherboards, or other circuit supporting hardware. As a circuit, graphics circuit 532 may include various switches, controllers, processors, drivers, transistors, resistors, inductors, capacitors, interconnects, and other devices and structures as appropriate to perform the functions described herein with respect to FIG. 1-4 and 6.

Graphics circuit 532 is coupled to video memory 536 (e.g., 8 Megabytes) and video BIOS 540, all of which may be integrated onto a single card or device, as designated by numeral 544. Video memory 536, and video BIOS 540 includes code and video services for controlling graphics circuit 532. In another embodiment, graphics circuit 532 is coupled to CPU 504 through an Advanced Graphics Port (AGP) bus. Graphics circuit 532 provides a video signal to displace screen 548. For example, circuit 532 may send a graphics image, object, or frame to display on display screen 548 to be observed by a person or operator of system 500.

The mass storage device 552 includes (but is not limited to) a hard disk, floppy disk, compact disk read only memory (CD-ROM), digital video disk read only memory (DVD-ROM), tape, high density floppy, high capacity removable media, low capacity removable media, solid state memory device, and combinations thereof. Communication interface device 556 includes a network card, a modem interface, or a similar communications device for accessing network 563 via communications link 560. In addition, communications interface device 556 may include communication ports such as serial ports (e.g., IEEE RS-232), parallel ports (e.g., IEEE-1284), Universal Serial Bus (USB) ports, and infra-red (IR) ports.

The I/O devices $568_1$-$268_N$ include a keyboard, mouse, audio/sound card, printer, and the like. For example, an audio sound card may be coupled to one or more speakers. Also, a keyboard, mouse, and the like may be used to input data.

Expansion bus controller 572 is coupled to nonvolatile memory 575, which includes system firmware 576. System firmware 576 includes system BIOS, which are for controlling, among other things, hardware devices in system 500. System firmware 576 also includes ROM 580 and flash (or EEPROM) 584. Expansion bus controller 572 is also coupled to expansion memory 588 having RAM, ROM, and/or flash memory (not shown). System 500 may additionally include memory module 590 that is coupled to bus controller 512. In one embodiment, memory module 590 comprises ROM 592 and flash (or EEPROM) 594.

Moreover, system 500 may include, store, load, and execute or run a computer program, operating system, graphics driver, application, software, or sequence of instructions to perform the functions described herein with respect to FIGS. 1-4 and 6.

As is familiar to those skilled in the art, system 500 may include a graphics driver (e.g., such as part of an operating system (OS)) and at least one application program, which in one embodiment, are loaded into system memory 524 from mass storage device 552 and launched after power on self test (POST). The OS may include any type of OS including, but not limited or restricted to, disk operating system (DOS), Windows, Unix, Linux, OS/2, OS/9, Xenx, etc. The operating system and/or graphics driver may each be a set of one or more programs which control system 500's operation and the allocation of resources. The application program may be a set of one or more software programs having graphics, graphics object, images, graphics frames, and/or video to be displayed to a user.

Figure 6:
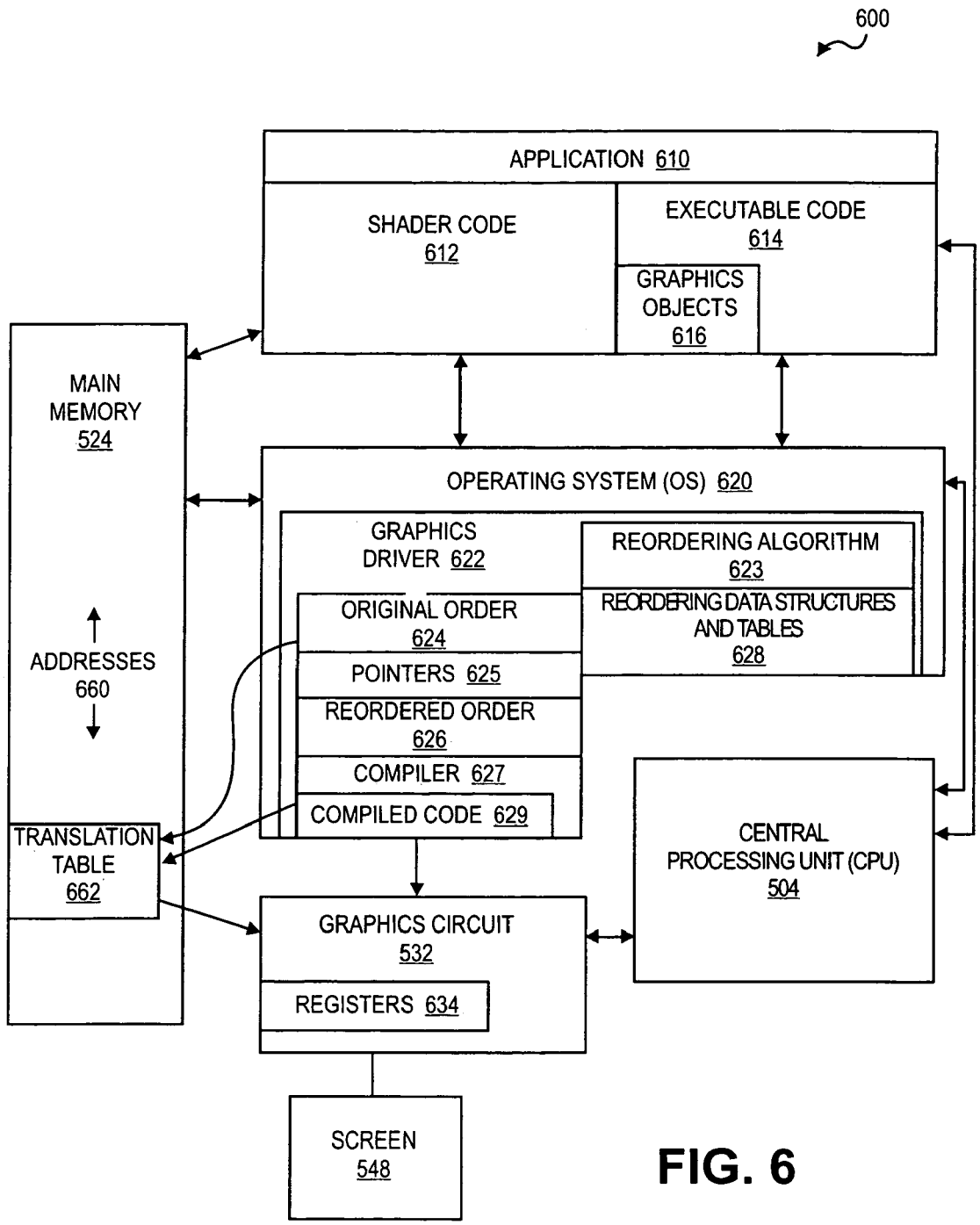
FIG. 6 is a reduced memory shader code compiler.

FIG. 6 is a reduced memory shader code compiler. FIG. 6 shows compiler 600 which may or not be a part of system 500. Likewise, compiler 600 may include components or features that are not described above with respect system 500. Compiler 600 is shown including operating system 620 linked to application 610, main memory 524, graphics circuit 532, and central processing unit 504. Application 610 is shown including shader code 612 and executable code 614 having objects 616. Application 610 may be an application as described above with respect to block 110 through 130 of FIG. 1, block 210 of FIG. 2, and/or an application as described with respect to FIG. 5. Main memory 524 includes addresses 660 such as addresses or location for storing application at code, shader code, pointers, executable code, operating system code, graphics driver code, original orders, re-ordered orders, compiled code, re-ordering algorithms, re-ordering data structures and tables, and translation tables as described herein. Graphics circuit 532 includes registers 634, such as registers for loading compiled code compiled from re-ordered orders or sequences of shader code.

Operating system 620 is shown including graphics driver 622. Graphics driver 622 includes original order 624, pointer 625, re-ordered order 626, compiler 627, re-ordering algorithm 623, and re-ordering data structures and table 628. Compiler 627 may include compile code 629.

Operating system 620 may include an operating system such as WINDOWS XP®, or another WINDOWS® operating system by Microsoft Corporation of Redmond, Wash. Operating System 620 may also include a MACINTOSH® operating system by Apple Computer of Cupertino, Calif.; or another operating system as describe above with respect to an operating system of system 500 (such as loaded into system memory 524, at FIG. 5).

Compiler 600 may include appropriate electronic or computer hardware and software for performing functions as described above with respect to FIGS. 1-5. For instance, FIG. 6 may perform re-ordering and compiling of shader code into compiled code using pointers as described with respect to block 160 of FIG. 1, blocks of FIG. 2, and examples 300 and 400 of FIGS. 3 and 4. Specifically, operating system 620 may include or access a machine accessible medium (e.g., such as storage 562 of FIG. 5) containing a sequence of instruction (such as including graphics driver 622, and components thereof) that when executed by a processor (such a CPU 504) cause compiler 600 to load application 610 (e.g., such as described with respect to loading an application at block 110 of FIG. 1), execute executable code 614 (e.g., as described at block 120 of FIG. 1), send graphics objects 616 and shader code 612 (or a portion thereof), to graphics driver 622 (e.g., as described at block 130 of FIG. 1), determine whether a translation table exists in translation table 662 for the shader code (e.g., as described at block 140 of FIG. 1), translate the shader code using table 662 (as described at block 150 of FIG. 1), if a table exists, or re-order and compiler shader code 612 into compile code using graphics driver 622 (e.g., as described at block 160 of FIG. 1, blocks 210-290 of FIG. 2, and in FIGS. 3 and 4), store a translation table for translating the compiled shader code into compiled code in table 662 (e.g., as described at block 170 of FIG. 1 using original order 624 and compile code 629, store compiled code 629 in registers 634 of circuit 532 (e.g., as described at block 180 of FIG. 1), and display objects 616 on screen 548 using circuit 532 and registers 634 (e.g., as described at block 190 of FIG. 1, and with respect to FIG. 5).

Thus, compiler 600 may perform functions described above with respect FIGS. 1-5. Specifically, compiler 600 may be a computer unit of an operating system 620 installed therein, memory 524 (e.g., a main memory, RAM memory and/or CACHE memory) having addresses 660. At addresses 660, memory 524 may have physical addresses; virtual addresses; locations for storing original order 624, pointer 625, re-ordered order 626, compiler 627 and/or compiled code 629. Likewise, addresses 660 of memory 524 may store other parts of application 610, re-ordering algorithm 623, graphics driver 622 and re-ordering data structures and table 628. Thus, it can be appreciated that compiler 600 has application 610, operating system 620, memory 524, circuit 532, driver 622, order 624, pointer 625, order 626, compiler 627, algorithm 623, and tables 628 to re-order graphics shader instructions of a high level language or text shader, from an original order, to a re-ordered order, using pointers (e.g., as described with respect to FIGS. 2-4 above) as described herein, so that the re-ordered order can be compiled into compiled code to be stored in registers 634 and tables 662 to allow objects 616 to be displayed on screen 548.

According to embodiments, the concepts described above with respect to FIGS. 1-6 may be applied in situations where shader code instructions are selected, switched, and/or moved according to their address in memory or location in a sequence. For example, such cases may include where instead of selecting instructions to be switched, addresses in memory or locations in a sequence are selected to be switched, (e.g., such as block 225 of FIG. 2; lines 312 and 332 of FIG. 3; and/or lines 412 and 432 of FIG. 4). Moreover, in these embodiments, in certain situations, it may be possible to switch the pointers to the addresses or locations to point to each other without accessing the first or second addresses (e.g., as described above with respect to blocks 230 and 240 of FIG. 1; lines 314, 316, 334, and 336 of FIG. 3; and/or lines 414, 416, 434 and 436 of FIG. 4). For instance, the data or information that the instruction at the first address or location and the instruction at the second address or location are to be switched maybe retained until the first address or location is switched to the second or location and vice versa. Referring to FIG. 2, for example, block 225 may include selecting the addresses to have their instructions switched, but block 230 and 240 may be unnecessary. Instead, processing may simply include blocks 250 and 260 to move the pointers from a first address to a second address and vice versa, because it will be irrelevant which instructions are being moved. Thus, the end result is the pointers for the instructions that were stored at the selected addresses now point to the address of the other instruction and vice versa.

Although the concepts described herein are described with respect to re-ordering graphics shader instructions, the concepts may also be applied to re-ordering other types of graphics instructions, instructions other than graphics instruction, or other data stored in addresses, locations, or sequences in memory. For example, the re-ordered instructions may be destined for a graphics circuit, or a circuit other than a graphics circuit. For example, the re-ordered instructions may be destined for a processor, a co-processor, an arithmetic processor, storage in memory, transmission across a network, or for use other than for rendering or displaying graphics, such as on a screen. Likewise, the concepts above may be expanded to reordering other types of high level code, high level instructions, sets of data, arrays of data, types of data, or information stored at locations, addresses, or in a sequence, and to be re-ordered into a re-ordered order. It is also contemplated that similar concepts may be applied where the instructions are or include null instructions or do not exist at the pointed to locations. Instead, at these locations, another type of data may exist. In addition, the concepts above may be applied for re-ordering instructions to be compiled, other than by JIT compiling. In some cases, the concepts may be applied to re-order instructions so that the instructions can be executed in the re-ordered order, without compiling.

In the foregoing specification, specific embodiments are described. However, various modifications and changes may be made thereto without departing from the broader spirit and scope of embodiments as set forth in the claims. The specification and drawings are, accordingly, to be regarded in an illustrative rather than a restrictive sense.

What is claimed is:

1. A method comprising:
   storing in a memory, a plurality of instructions at a plurality of addresses;
   storing in the memory, a plurality of pointers to the plurality of addresses, each pointer associated with an instruction;
   moving a first pointer associated with a first instruction from pointing to a first address to point to a second address of a second instruction;
   moving a second pointer associated with the second instruction from pointing to the second address to point to the first address,
   wherein moving the second pointer includes accessing the first pointer before moving the first pointer to determine that the second pointer is to point to the first address; and
   compiling into a compiled code a re-ordered order of the instructions after the instructions have been moved according to the moved pointers;
   accessing the second pointer before moving the second pointer to determine that the first pointer is to point to the second address;
   re-ordering the original order to a re-ordered order of the plurality of instructions at the plurality of addresses, wherein re-ordering comprises:
   moving a first instruction at the first address in the memory to the second address, wherein moving the first instruction comprises accessing the first pointer;
   moving a second instruction at the second address in the memory to the first address, wherein moving the second instruction comprises accessing the second pointer;
   just-in-time (JIT) compiling the re-ordered plurality of instructions into compiled code to be executed by a circuit.

2. The method of claim 1, further comprising:
selecting to access the second pointer to move the first pointer according to a re-ordering algorithm to move the instructions to a re-ordered order; and
selecting to access the first pointer to move the second pointer because the first pointer is to move according to the second pointer.

3. The method of claim 1, further comprising:
moving a third pointer associated with a third instruction from pointing to a third address to point to the first address, wherein moving the third pointer includes accessing the second pointer to determine that the third pointer is to point to the first address;
moving the second pointer from pointing to the first address to point to the third address;
wherein the moving the second pointer includes accessing the third pointer to determine that the second pointer is to point to the third address.

4. The method of claim 3, further comprising:
re-ordering the original order to a re-ordered order of the plurality of graphics instructions at the plurality of addresses, wherein re-ordering comprises:
moving the first instruction at the first address in the memory to the second address, wherein moving the first instruction comprises accessing the first pointer;
moving the second instruction at the second address in the memory to the third address, wherein moving the second instruction comprises accessing the second pointer;
moving the third instruction at the third address in the memory to the first address, wherein moving the third instruction comprises accessing the third pointer;
just-in-time (JIT) compiling the re-ordered plurality of instructions into compiled code to be executed by a circuit.

5. The method of claim 1, further comprising:
moving a third pointer associate with a third instruction from pointing to a third address to point to the second address, wherein moving the third pointer includes accessing the first pointer to determine that the third pointer is to point to the second address;
moving the first pointer from pointing to the second address to point to the third address;
wherein the moving the first pointer includes accessing the third pointer to determine that the first pointer is to point to the third address.

6. The method of claim 5, further comprising:
re-ordering the original order to a re-ordered order of the plurality of instructions at the plurality of addresses, wherein re-ordering comprises:
moving the first instruction at the first address in the memory to the third address, wherein moving the first instruction comprises accessing the first pointer;
moving the second instruction at the second address in the memory to the first address, wherein moving the second instruction comprises accessing the second pointer;
moving the third instruction at the third address in the memory to the second address, wherein moving the third instruction comprises accessing the third pointer;
just-in-time (JIT) compiling the re-ordered plurality of instructions into compiled code to be executed by a circuit.

7. A method comprising:
storing in a memory, a plurality of instructions at a plurality of addresses;
storing in the memory, a plurality of pointers to the plurality of addresses, each pointer associated with an instruction;
moving a first pointer associated with a first instruction from pointing to a first address to point to a second address of a second instruction;
moving a second pointer associated with the second instruction from pointing to the second address to point to the first address,
wherein moving the second pointer includes accessing the first pointer before moving the first pointer to determine that the second pointer is to point to the first address; and
compiling into a compiled code a re-ordered order of the instructions after the instructions have been moved according to the moved pointers, wherein the first pointer includes a first original location pointer to the location of the first instruction in the original order, and a first re-ordered location pointer to the location of the first instruction in the re-ordered order; and wherein the second pointer includes a second original location pointer to the location of the second instruction in the original order, and a second re-ordered location pointer to the location of the second instruction in the re-ordered order.

8. The method of claim 7, further comprising:
re-ordering the original order to a re-ordered order of the plurality of instructions at the plurality of addresses, wherein re-ordering comprises:
moving a first instruction from an address pointed to by the first original location pointer to an address pointed to by the first re-ordered location pointer; and
moving a second instruction from an address pointed to by the second original location pointer to an address pointed to by the second re-ordered location pointer.

9. The method of claim 7, wherein the first pointer further comprises a first instruction pointer to point to the first instruction and wherein the second pointer further comprises a second instruction pointer to point to the second pointer second instruction.

10. The method of claim 7, wherein the plurality of instructions are a plurality of graphics instructions, the first instruction is a first graphics instruction, and the second instruction is a second graphics instruction.

11. A machine-accessible medium containing a sequence of instructions that, when executed, cause a machine to:
execute an application including graphics shader instructions;
store the instruction in an original order of instructions in a memory;
re-order the original order to a re-ordered order of instructions in the memory, wherein re-ordering comprises:
moving a plurality of pointers, each pointer associated with an instruction, wherein moving includes moving each pointer from pointing to a location in the memory, to point to a different location in the memory;
moving each instruction associated with a pointer to the different location;
compile into a compiled code the re-ordered order of the instructions;
just-in-time compile the re-ordered order of instructions into compiled code;
store the compiled code in registers of a graphics processing unit (GPU);
store in the memory a table to convert the graphics shader instructions to the compiled code.

12. The machine accessible medium of claim 11, wherein re-ordering comprises selecting a first instruction and a second instruction to switch locations in the memory; and wherein moving comprises:

accessing a second pointer associated with the second instruction to identify a second location in the memory to move the first pointer to;

accessing a first pointer associated with the first instruction to identify a first location in the memory to move the second pointer to;

moving the first pointer from pointing to the first location to point to the second instruction;

moving the second pointer from pointing to the second location to point to the first location.

13. A machine-accessible medium containing a sequence of instructions that, when executed, cause a machine to:

execute an application including graphics shader instructions;

store the instruction in an original order of instructions in a memory;

re-order the original order to a re-ordered order of instructions in the memory, wherein re-ordering comprises:

moving a plurality of pointers, each pointer associated with an instruction, wherein moving includes moving each pointer from pointing to a location in the memory, to point to a different location in the memory;

moving each instruction associated with a pointer to the different location;

for each instruction, store an origination pointer and a re-ordered pointer in the memory associated with the instruction;

point each origination pointer to an address of an associated instruction in the original order;

move a plurality of re-ordered pointers according to an algorithm and information in an the instruction; then move the instructions from the original order to the re-ordered order according to the re-ordered pointers;

compile into a compiled code the re-ordered order of the instructions.

14. A system comprising:

a computer unit with an operating system installed therein;

a memory having a plurality of addresses storing:

a plurality of graphics shader instructions of a graphics application in an original order, and a plurality of pointers, each pointer associated with an instruction and including an origination pointer to point to a first address of the instruction in the original order, and a re-ordered pointer to point to a different second address for the instruction to be moved to;

a compiler to compile into a compiled code a re-ordered order of the instructions after the instructions have been moved according to the re-ordered pointers;

a processor coupled to the memory to execute the operating system in the memory; and a just-in-time compiler to compile into a compiled code a re-ordered order of the instructions after the instructions have been moved according to the re-ordered pointers.

15. The system of claim 14, further comprising:

a graphics driver to move the instructions to a re-ordered order according to a re-ordering algorithm; and a graphics processing unit (GPU) having registers to store the compiled code.

16. A system comprising:

a processor;

a first memory to store a graphics application to be executed by the processors, the first memory coupled to the processors;

graphics hardware to display graphics according to a reordered sequence of graphics instructions stored in a second memory, the graphics hardware coupled to the processor;

a second memory storing a first sequence of instructions in an original order to be re-ordered using to a plurality of pointers, each pointer associated with an instruction and pointing to a location in the sequence;

an operating system to cause the pointers to point to a different location depending on the graphics application and a reordering algorithm, to reorder the instructions into a different second sequence prior to compiling the instructions; and a compiler to compile into a compiled code a re-ordered order of the instructions after the instructions have been moved according to the re-ordered pointers.

17. The system of claim 16, further comprising:

a graphics compiler to compile the instructions after the instructions are re-ordered into the second sequence according to the pointers.

18. The system of claim 17, further comprising:

a graphics circuit and registers to display graphics of the graphics application according to the compiled re-ordered second sequence of instructions.

* * * * *